United States Patent
Bussit et al.

(10) Patent No.: US 9,068,590 B2
(45) Date of Patent: Jun. 30, 2015

(54) ROLLING BEARING ASSEMBLY DEVICE FOR STEERING COLUMN

(71) Applicants: Sylvain Bussit, Monnaie (FR); Daniel Jansen, Tours (FR); Thomas Lepine, Villandry (FR); Bruno Montboeuf, Cerelles (FR)

(72) Inventors: Sylvain Bussit, Monnaie (FR); Daniel Jansen, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/906,046

(22) Filed: May 30, 2013

(65) Prior Publication Data

US 2013/0327175 A1    Dec. 12, 2013

(51) Int. Cl.
*F16C 25/08* (2006.01)
*F16C 19/06* (2006.01)
*B62D 1/16* (2006.01)
*F16C 35/073* (2006.01)
*F16C 19/16* (2006.01)
*F16C 27/06* (2006.01)
*F16C 19/10* (2006.01)

(52) U.S. Cl.
CPC . *F16C 19/06* (2013.01); *B62D 1/16* (2013.01); *F16C 35/073* (2013.01); *F16C 19/163* (2013.01); *F16C 25/083* (2013.01); *F16C 27/066* (2013.01); *F16C 19/10* (2013.01); *F16C 2326/24* (2013.01)

(58) Field of Classification Search
CPC ......... F16C 25/083; F16C 19/10; F16V 25/08
USPC .............. 384/517, 537–539; 280/775; 74/492
See application file for complete search history.

(56) References Cited

U.S. PATENT DOCUMENTS

| | | | |
|---|---|---|---|
| 3,835,725 A * | 9/1974 | Furusho et al. ................. | 74/492 |
| 4,181,380 A * | 1/1980 | Vinel et al. ..................... | 384/611 |
| 4,569,602 A * | 2/1986 | Lundgren ..................... | 384/499 |
| 5,028,152 A * | 7/1991 | Hill et al. ....................... | 384/557 |
| 6,158,896 A * | 12/2000 | Zernickel et al. ............. | 384/506 |
| 6,179,473 B1 * | 1/2001 | Ponson et al. ................ | 384/537 |
| 6,375,360 B1 * | 4/2002 | Weisskopf et al. ........... | 384/538 |
| 8,684,608 B2 * | 4/2014 | Ince et al. ..................... | 384/493 |
| 2009/0080824 A1 * | 3/2009 | Joki et al. ..................... | 384/557 |
| 2012/0106884 A1 * | 5/2012 | Doerrfuss et al. ............. | 384/493 |
| 2013/0333511 A1 * | 12/2013 | Bussit et al. .................... | 74/492 |
| 2014/0314362 A1 * | 10/2014 | Bussit et al. .................. | 384/515 |
| 2014/0321780 A1 * | 10/2014 | Bussit et al. .................. | 384/125 |

FOREIGN PATENT DOCUMENTS

| | | |
|---|---|---|
| EP | 1184583 A1 | 6/2002 |
| FR | 2933157 A1 | 1/2010 |
| JP | 2002021847 A | 1/2002 |
| WO | 0169098 A1 | 9/2001 |

* cited by examiner

*Primary Examiner* — James English
(74) *Attorney, Agent, or Firm* — Bryan Peckjian; SKF USA Inc. Patent Dept.

(57) ABSTRACT

A rolling bearing assembly device comprising an outer race, an inner race, a row of rolling elements arranged between the outer and inner races, a sleeve mounted in the bore of the inner race, and an elastic preload element capable of applying an axial preload transmitted to the inner race. The elastic preload element is mounted in direct contact with an annular axial centering portion and bearing axially over its entire periphery against a radial bearing flange extending radially from the axial centering portion towards the outside of the device.

13 Claims, 8 Drawing Sheets

ROLLING BEARING ASSEMBLY DEVICE FOR STEERING COLUMN

CROSS-REFERENCE TO RELATED APPLICATIONS

This application claims priority to French patent application no. 1255036 filed May 31, 2012, the contents of which are fully herein incorporated by reference.

FIELD OF THE INVENTION

The present invention relates to the field of rolling bearing assembly devices, notably rolling bearing assemblies used in motor vehicle steering columns.

BACKGROUND OF THE INVENTION

Steering columns generally comprise a shaft, one end of which is secured to a steering wheel that drives it and is turned by the driver of the vehicle and the other end of which is secured to mechanical components the role of which is to perform the angular positioning of the wheels of the vehicle. The steering column shaft is mounted such that it can rotate in a tubular housing via two rolling bearing assembly devices each comprising a rolling bearing, generally an angular-contact ball bearing, which are mounted in opposition.

The rolling bearing assembly generally comprises an inner race, an outer race, each race being provided with a raceway and a row of rolling elements which is arranged between the two raceways of the races. The rolling bearing assembly is mounted in the housing via its outer race and on the shaft directly or via a sleeve or a ring known as a tolerance ring. A tolerance ring provides the interface between the shaft and the inner race of the rolling bearing and compensates for any geometric defects there might be between these two components. The tolerance ring allows the rolling bearing assembly to be mounted easily on the shaft without initial clamping effect.

Preferably, the assembly operates with no clearance thanks to an axial preload applied to the tolerance rings by an axially elastic member which may, for example, be a spring or a spring washer.

Thus the internal clearance within the rolling bearings is taken up, and permanent contact between the races and the rolling elements of the rolling bearing assembly is ensured.

Reference may be made on this subject to document EP 1 184 583 which describes a rolling bearing assembly device comprising an inner race, an outer race, a row of rolling elements which is arranged between the races, a tolerance ring that provides the connection between the shaft and the inner race and an axial preload elastic element. The elastic element is a washer comprising three crinkles, each bearing axially against the tolerance ring, and comprises fixing tabs for attachment to the inner race.

However, such a rolling bearing assembly device is complex to use and does not allow good distribution of axial preload over the inner race.

Reference may also be made to document WO 01/69098 which describes, in a first embodiment, a rolling bearing assembly comprising an inner race, an outer race, a row of rolling elements which is arranged between the races, a tolerance ring providing the connection between the shaft and the inner race, a damping element and a crinkle washer which is arranged axially between one radial surface of the tolerance ring and the damping element. The crinkle washer allows an axial preload to be applied. That document describes another embodiment in which the damping element comprises a metallic insert and a plurality of studs directed towards the radial surface of the tolerance ring, so that the crinkle washer can be omitted.

However, such rolling bearing assembly devices comprise a plurality of components and a damping element which is complicated to produce. Furthermore, because the axial dimension of the damping element exceeds the axial dimension of the tolerance ring, such a rolling bearing assembly device is not sufficiently compact in the axial direction. Finally, the distribution of axial preload over the inner race is not over the entire periphery of the inner race.

SUMMARY OF THE INVENTION

It is therefore an object of the present invention to remedy these disadvantages.

More specifically, the present invention seeks to provide a rolling bearing assembly device that is easy to manufacture, to assembly, is of small bulk, economical, and affords good distribution of axial preload over the inner race.

One subject of the invention is a rolling bearing assembly device comprising an outer race, an inner a race, a row of rolling elements which is arranged between the outer and inner races, a sleeve mounted in the bore of the inner race, the said sleeve comprising an annular axial centering portion and an annular radial bearing flange extending radially from the axial centering portion towards the outside of the device, and an elastic preload element capable of applying an axial preload which is transmitted to the inner race.

The elastic preload element is mounted in direct contact on the annular axial centering portion and so that it bears axially over its entire periphery against the radial bearing flange.

The annular shape of the radial bearing flange makes it possible to obtain continuous pressure in the circumferential direction between the sleeve and the preload element, i.e. pressure over the entire periphery of the radial bearing flange, encouraging good distribution of the preload. In addition, the annular shape of the centering portion makes it possible to achieve uniform radial creep of the preload element, likewise encouraging good distribution of the preload.

In one embodiment, the elastic preload element is mounted in direct contract with the inner race.

In one embodiment, the elastic preload element comprises a first radial surface bearing axially against the radial bearing flange, on the opposite side to the inner race.

Advantageously, the rolling bearing assembly device comprises an axial retention means comprising an axial part surrounding the elastic preload element and a plurality of radial tabs bearing axially against a second radial surface of the elastic preload element which is the opposite surface to the first radial surface.

In one embodiment, the sleeve comprises an axial part forming a radial retention means in radial contact with an axial surface of the elastic preload element, the said elastic preload element being arranged radially between the said axial part and the annual axial centering portion.

The sleeve may be made as a single piece.

In one embodiment, the elastic preload element has an annular shape comprising an interior bore in direct contact with the exterior cylindrical surface of the centering portion of the sleeve.

In one embodiment, the elastic preload element has a right cross section of circular or parallelepipedal, for example square or rectangular, shape.

The elastic preload element may be made of synthetic material, such as a polymer substance for example.

Advantageously, a groove is made on the outer cylindrical surface of the centering portion, the said groove being consistent in shape with the elastic preload element.

A second aspect of the invention relates to a steering column providing a housing, a shaft, and at least one rolling bearing assembly device described hereinabove, which is mounted between the housing and the shaft.

BRIEF DESCRIPTION OF THE FIGURES

The present invention will be better understood from reading the description of a number of embodiments, which are given by way of entirely nonlimiting examples and illustrated in the attached drawings.

DETAILED DESCRIPTION OF THE INVENTION

The rolling bearing assembly device, of axial axis X, referenced 1 in its entirety in FIGS. 1 to 7, is intended to be mounted in a motor vehicle steering column, notably between a tubular housing 14 comprising a bore, and a rotary shaft 15.

Figure 1:
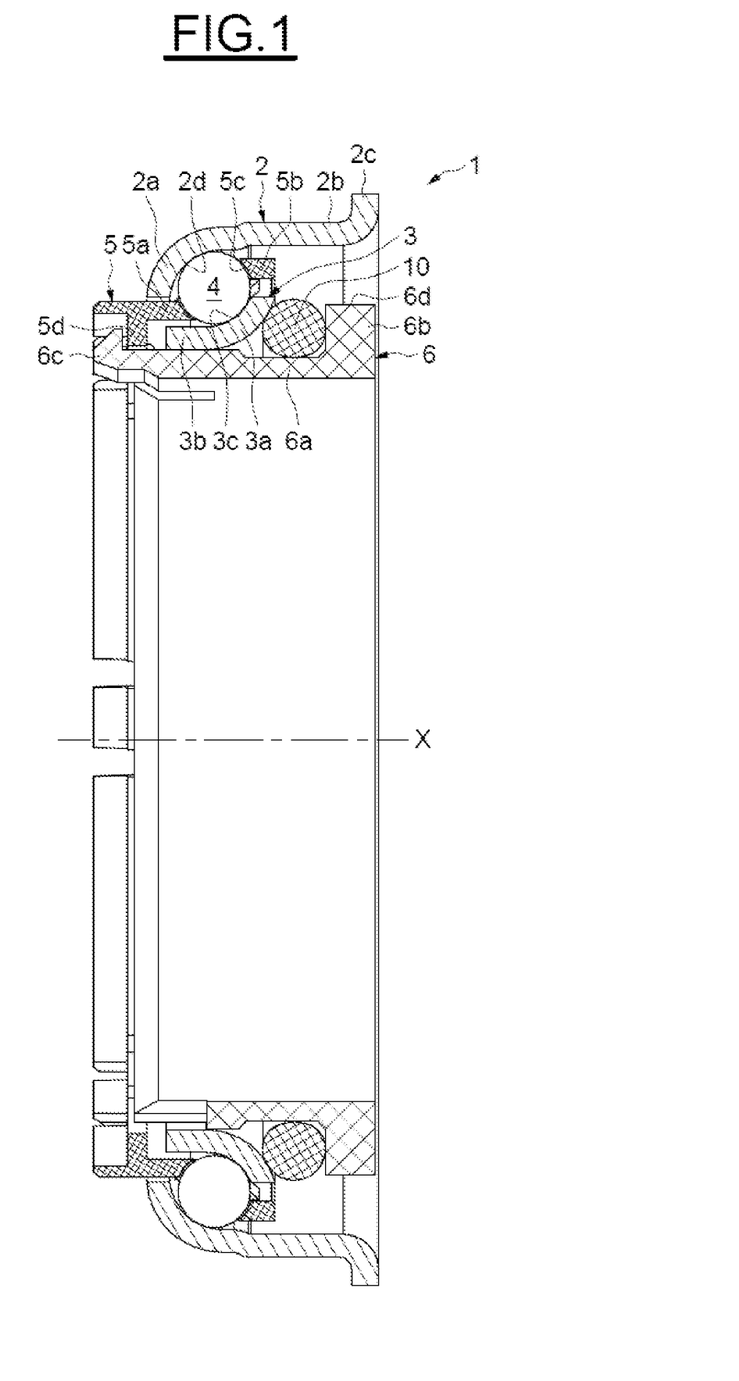
FIG. 1 is a view in axial section of a rolling bearing assembly device according to a first embodiment of the invention.
Figure 2:
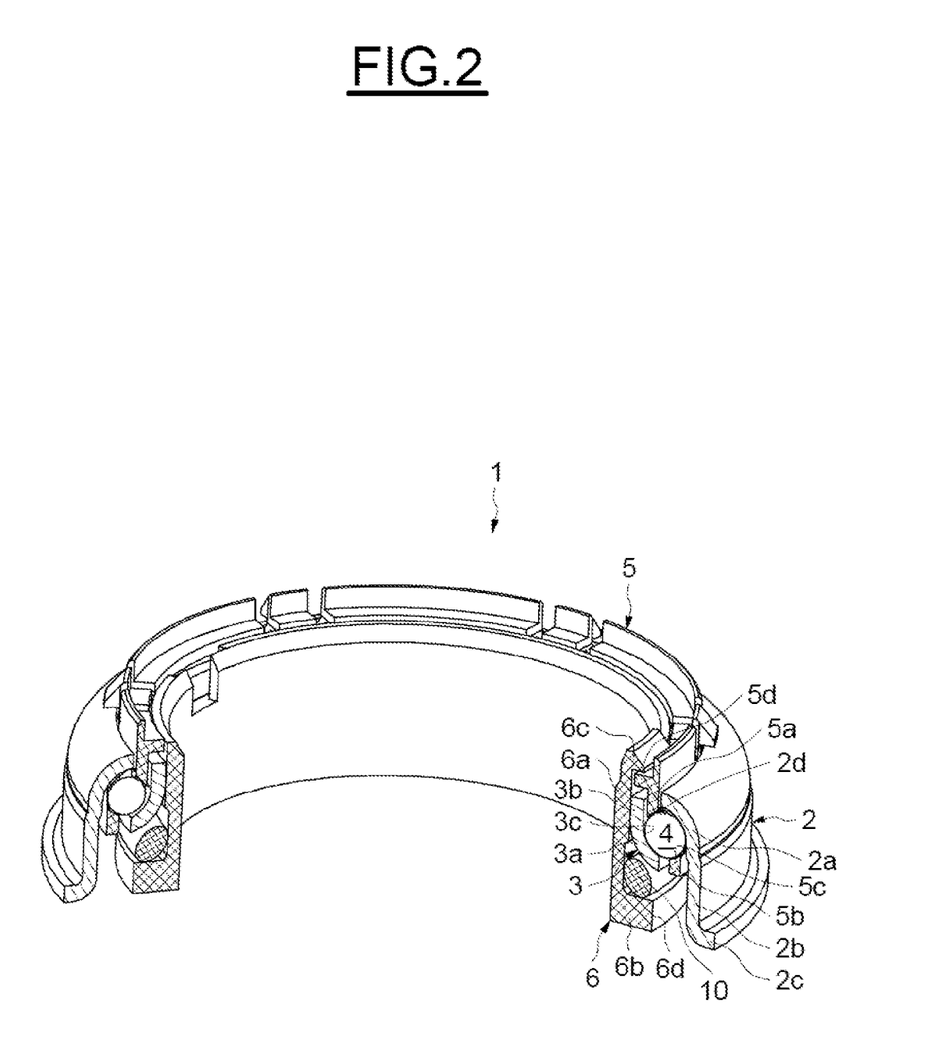
FIG. 2 is a perspective view in cross section of the device of FIG. 1.

As illustrated in FIGS. 1 and 2, the rolling bearing assembly device 1 comprises an outer race 2, an inner race 3, a row of rolling elements 4, such as balls for example, a cage 5 for maintaining an even circumferential spacing of the rolling elements 4, and a sleeve 6 or tolerance ring mounted in the inner race 3.

The outer race 2 comprises a torroidal portion 2a, an axial portion 2b and a radial rim 2c. The axial cylindrical portion 2b is arranged between the torroidal portion 2a and the radial rim 2c. The torroidal portion 2a has an interior surface that is concave in axial section to form a raceway 2d for the rolling elements 4. The radial rim 2c is directed radially towards the outside from the axial portion 2b. The torroidal portion 2a is directed radially towards the inside from the axial portion 2b.

The inner race 3 comprises a torroidal portion 3a and an axial cylindrical portion 3b. The torroidal portion 3a on its exterior surface, which in axial section is concave, forms a raceway 3c for the rolling elements 4. The raceway 2d is arranged on one side and the raceway 3c on the other side of a radial plane that passes through the centre of the rolling elements 4. The rolling bearing assembly device 1 offers angular contact for the rolling elements 4, thus giving it the ability to react axial load in one direction and radial load. The outer race 2 and inner race 3 may be made from a portion of tube or from a piece of sheet metal, for example by cutting and pressing. The thickness of the outer race 2 and of the inner race 3 may be substantially constant.

The cage 5 may be made of a synthetic material, for example of a polyamide, possibly reinforced with a mineral filler. The cage 5 comprises an axial annular portion 5a of small diameter passing between the free end of the torroidal portion 2a of the outer race 2 and an exterior surface of the axial portion 3b of the inner race 3, and an axial annular portion 5b of large diameter which is arranged on the opposite side, in other words passing between the free end of the torroidal portion 3a of the inner race 3 and a bore of the axial portion 2b of the outer race 2. As illustrated, the small-diameter axial annular portion 5a extends beyond the axial ends of the inner race 3.

The cage 5 also comprises an oblique central portion (not depicted) connected by one end to the axial annular portion 5a and by the other end connected to the portion 5b and in which the pockets 5c for the rolling elements 4 are formed.

The small-diameter axial annular portion 5a is provided with a radial protrusion 5d extending towards the sleeve 6 and intended to collaborate with the sleeve 6 for the axial retention of the rolling bearing on the sleeve 6.

The sleeve 6 comprises an annular axial centering portion 6a arranged in the bore of the inner race 3, a radial bearing flange 6b extending outwards from one end of the axial centering portion 6a on the same side as the large-diameter annular axial portion 5b of the cage 5, and a plurality of hooks 6c extending radially outwards from one end of the axial centering portion 6a which is the opposite end to the radial bearing flange 6b. The hooks 6c, which are evenly circumferentially distributed about the periphery of the sleeve 6 in a discontinuous manner are designed to collaborate with the radial protrusion 5d of the cage 5. The sleeve 6 is produced as a single piece.

The rolling bearing assembly device 1 further comprises an elastic preload element 10 separate from the sleeve 6 and capable of applying an axial preload which is transmitted to the inner race 3. In the example illustrated in FIGS. 1 and 2, the elastic element 10 is of toric annular shape, having a right cross section of substantially circular shape. The elastic element 10 is mounted in direct contact with the exterior cylindrical surface (unreferenced) of the annular axial centering portion 6a of the sleeve 6 and bearing axially against the radial bearing flange 6b. The outside diameter of the elastic torus 10 is substantially equal to the diameter of the exterior cylindrical surface 6d of the radial flange 6b of the sleeve 6. The inside diameter of the elastic torus 10 is substantially equal to the diameter of the exterior cylindrical axial surface of the axial centering portion 6a of the sleeve 6. The elastic element 10 bears continuously in the circumferential direction against a radial face of the radial bearing flange 6b, i.e. over the entire periphery of the radial bearing flange 6b.

The elastic element 10 is made of a synthetic material or polymer, such as rubber for example.

By way of a variant, a groove may be provided on the exterior cylindrical surface of the axial centering portion 6a, the shape of this groove being consistent with the shape of the torroidal elastic element 10.

Figure 3:
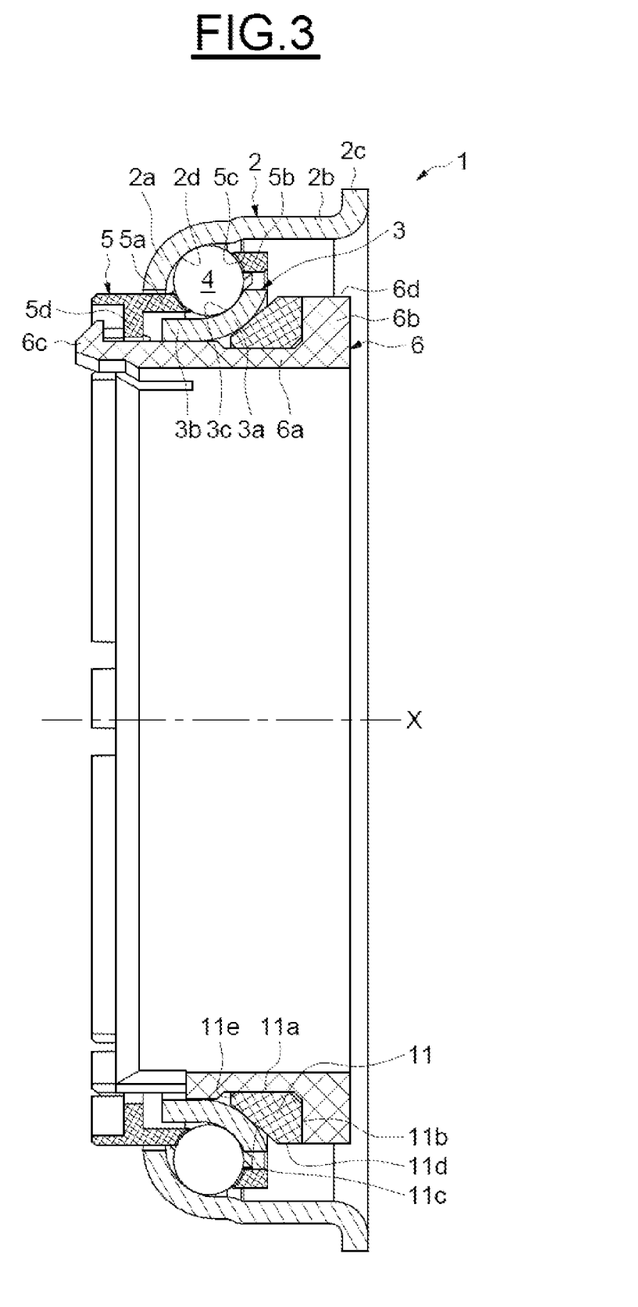
FIG. 3 is a view in axial section of a rolling bearing assembly device according to a second embodiment of the invention.

The embodiment illustrated in FIG. 3, in which the same elements bear the same references, differs from the embodiment of FIGS. 1 and 2 only in terms of the shape of the elastic preload element.

As illustrated in FIG. 3, the rolling bearing assembly device 1 comprises an elastic preload element 11 of annular shape having a right cross section of parallelepipedal shape. The preload element 11, separate from the sleeves 6, comprises an interior cylindrical axial surface 11a in contact with the exterior cylindrical axial surface (unreferenced) of the annular axial centering portion 6a of the sleeve 6, a first radial surface 11b, substantially perpendicular to the interior axial surface 6a, bearing axially directly against the radial bearing flange 6b, and an oblique surface 11c in direct contact with the exterior surface (unreferenced) of the torroidal portion 3a of the inner race 3. As illustrated, the elastic element 11 comprises an exterior cylindrical axial surface 11d connecting one end of the first radial surface 11b to one end of the oblique portion 11c and a second radial surface 11e connecting one end of the internal cylindrical surface 11a to one end of the oblique portion 11c. An alternative variant might be to provide a triangular shape, the oblique portion 11c of which would be directly connected to one end of the first radial surface 11b and to one end of the interior cylindrical axial surface 11a.

The outside diameter of the elastic element 11 is substantially equal to the diameter of the exterior cylindrical surface 6d of the radial flange 6b of the sleeve 6. The inside diameter of the internal cylindrical surface 11a of the elastic element 11 is substantially equal to the diameter of the exterior cylindrical surface of the axial centering portion 6a of the sleeve 6. The elastic element 11 illustrated in FIG. 3 bears axially continuously in the circumferential direction against a radial face of the radial bearing flange 6b, i.e. around the entire periphery of the radial bearing flange 6b.

Figure 4:
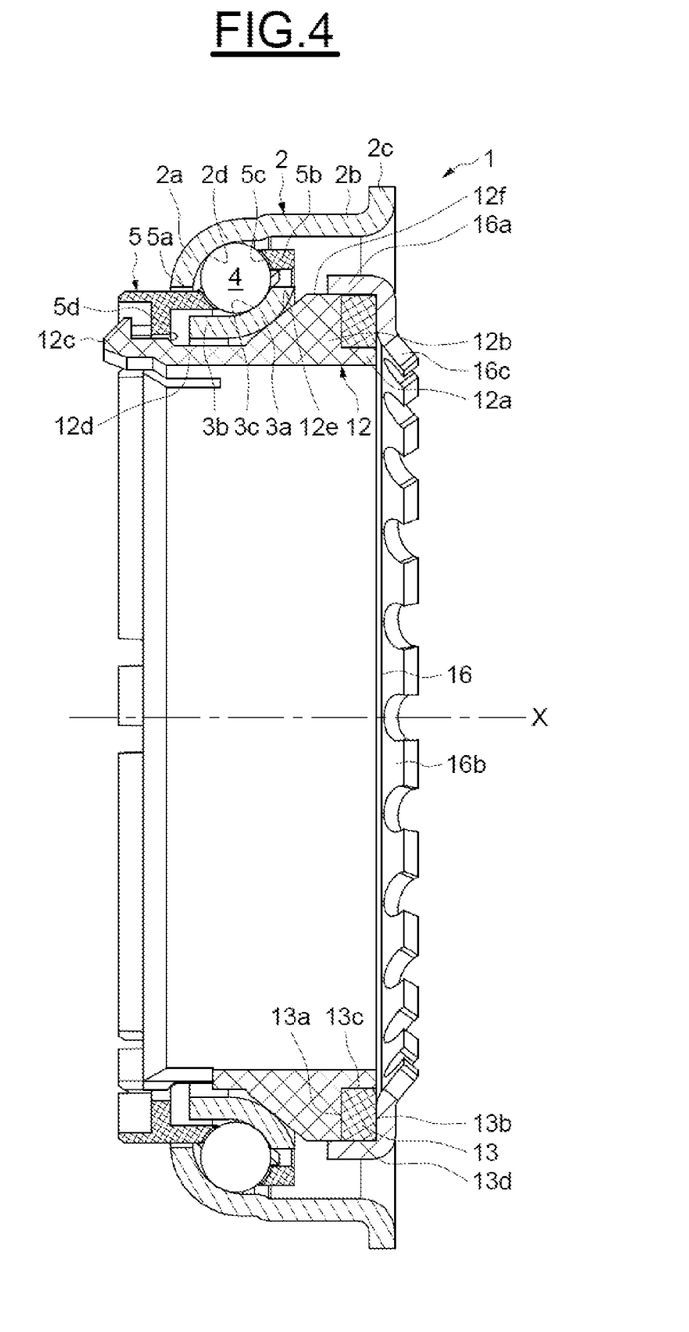
FIG. 4 is a view in axial section of a rolling bearing assembly device according to a third embodiment of the invention.
Figure 5:
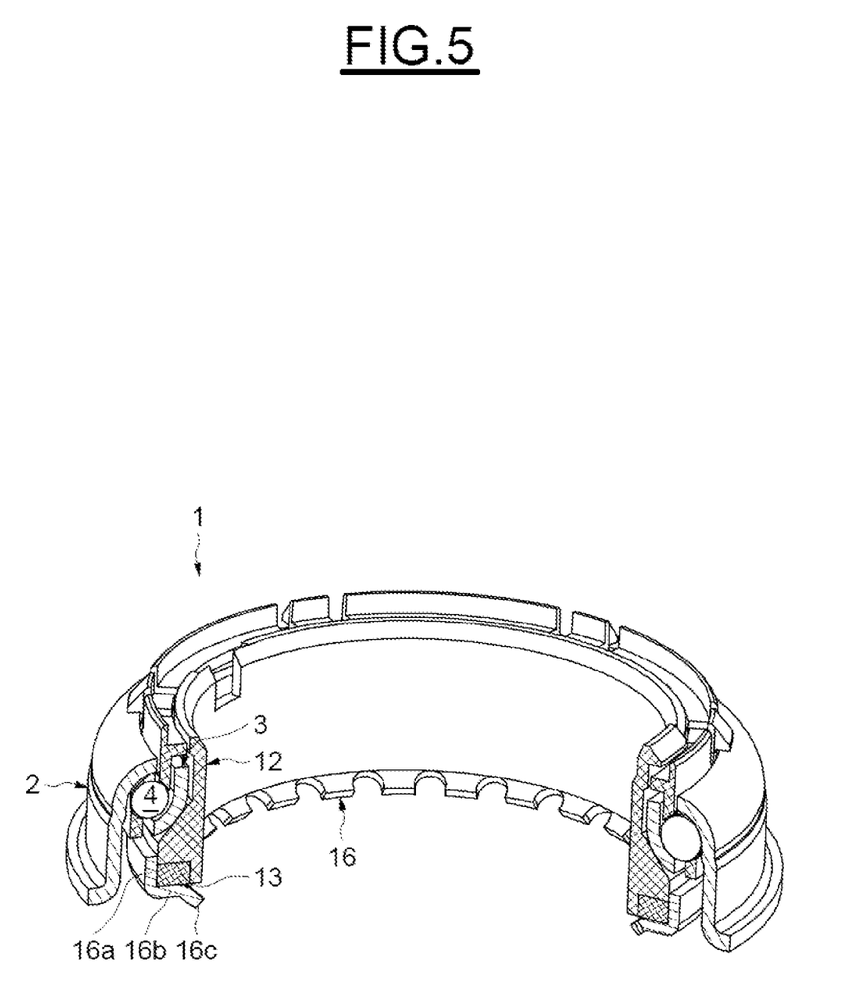
FIG. 5 is a perspective view in cross section of the device of FIG. 4.
Figure 6:
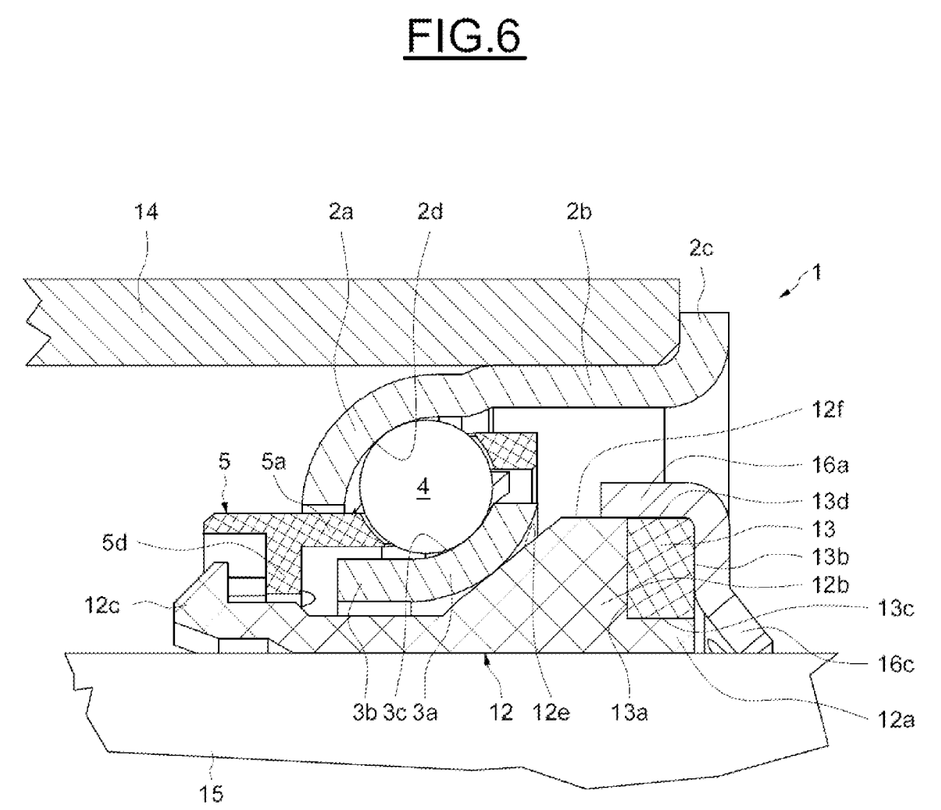
FIG. 6 is a partial view in axial section of the device of FIG. 4 in an assembled steering column.

The embodiment illustrated in FIGS. 4 to 6, in which the same elements have the same references, differs from the embodiment of FIGS. 1 and 2 only in the shape of the elastic preload element and the shape of the sleeve.

As illustrated in FIGS. 4 to 6, the rolling bearing assembly device 1 comprises a sleeve 12 comprising an annular axial centering portion 12a which is arranged in the bore of the inner ring 3, a radial bearing flange 12b extending outwards from one end of the axial centering portion 12a on the same side as the large-diameter annular axial portion 5b of the cage 5, and a plurality of hooks 12c which are connected to the radial bearing flange 12b by a second axial portion 12d. The hooks 12c extend radially outwards from one end of the second axial portion 12d which is the opposite end to the radial bearing flange 12b. The hooks 12c, which are evenly circumferentially distributed about the periphery of the sleeve 12 in a discontinuous manner, are designed to collaborate with the radial protrusion 5d of the cage 5. The radial bearing portion 12b has a substantially oblique surface 12e in direct contact with the exterior surface (unreferenced) of the torroidal portion 3a of the inner race 3. The sleeve 12 is produced as a single piece.

The rolling bearing assembly device 1 illustrated in FIGS. 4 to 6 further comprises an elastic preload element 13, separate from the sleeve 12, of annular shape and having a right cross section of substantially rectangular shape. The elastic preload element 13 comprises a first radial surface 13a in direct axial contact with a radial surface of the radial flange 12b which is the opposite surface to the oblique surface 12e, a second radial surface 13b, an interior cylindrical axial surface 13c and an exterior cylindrical axial surface 13d. A variant option would be to provide a square shape or any other parallelepipedal shape. The elastic element 13 is mounted in direct contact with the exterior cylindrical surface (unreferenced) of the annular axial centering portion 12a of the sleeve 12 and bearing axially continuously in the circumferential direction against a radial surface of the radial bearing flange 12b, which is on the opposite side to the inner race 3, i.e. over the entire periphery of the radial bearing flange 12b.

The outside diameter of the elastic element 13 is substantially equal to the diameter of the exterior cylindrical surface 12f of the radial flange 12b of the sleeve 12. The inside diameter of the internal cylindrical axial surface 13c of the elastic element 13 is substantially equal to the diameter of the exterior cylindrical surface of the axial centering portion 12a of the sleeve 12.

The axial dimension of the elastic element 13 is substantially equal to the axial dimension of the centering portion 12a of the sleeve 12, so that it does not extend beyond the sleeve 12.

As illustrated in FIG. 6, the rolling bearing assembly device 1 is mounted in the bore of a housing 14 and on a shaft 15. The rolling bearing assembly device 1 comprises an axial retention means 16 or a locking washer comprising an annular axial part 16a and a plurality of radial tabs 16b extending inwards from the axial part 16a. Each radial tab 16b at its end has a substantially oblique part 16c intended to flex elastically when the locking washer 16 is fitted onto the shaft 15 and, through bracing against the shaft, prevent any axial movement of the locking washer 16 along the shaft 15 in the opposite direction to the direction in which it was fitted.

The second radial surface 13b is in direct axial contact with the radial tabs 16b of the locking washer 16 and the outside diameter of the elastic element 13 is substantially equal to the inside diameter of the annular axial part 16a of the axial retention means 16.

Figure 7:
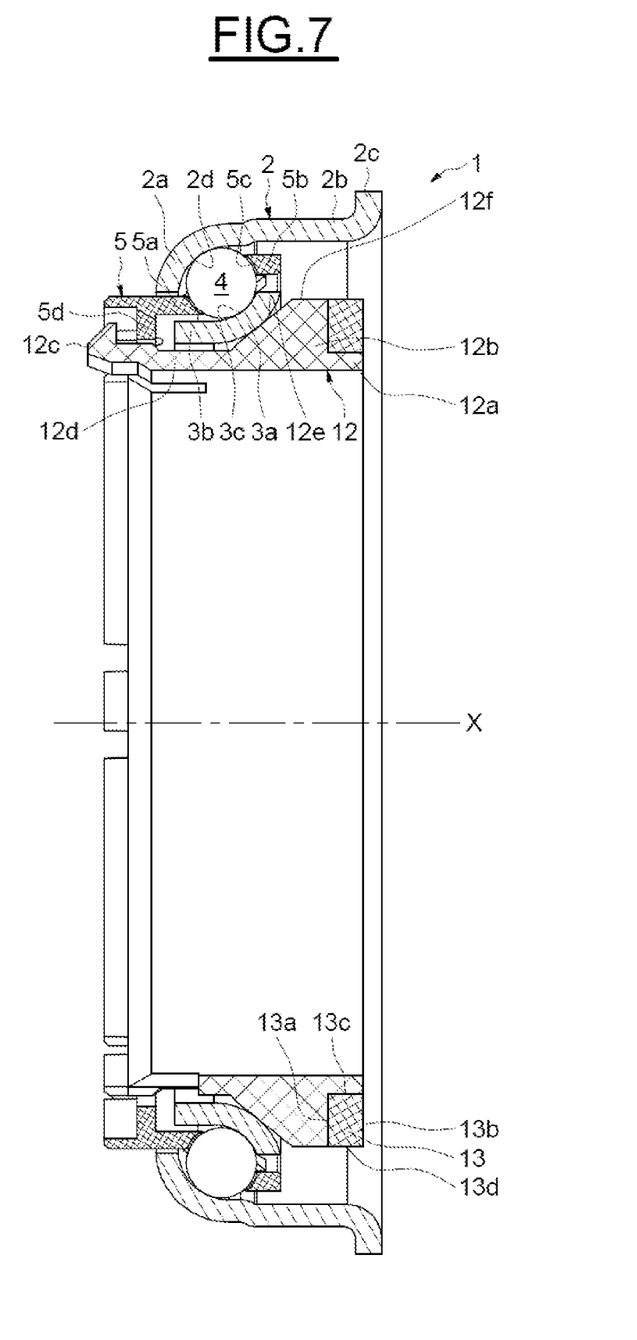
FIG. 7 is a view in axial section of a rolling bearing assembly device according to a fourth embodiment of the invention.

As a variant, as illustrated in FIG. 7, in which the same elements bear the same references, the elastic element 13 is fitted tightly onto the axial centering portion 12a of the sleeve 12 and does not require the use of a locking washer.

It will be noted that the locking washer illustrated in FIGS. 4 to 6 may also be used in the embodiments of FIGS. 1 to 3.

Figure 8:
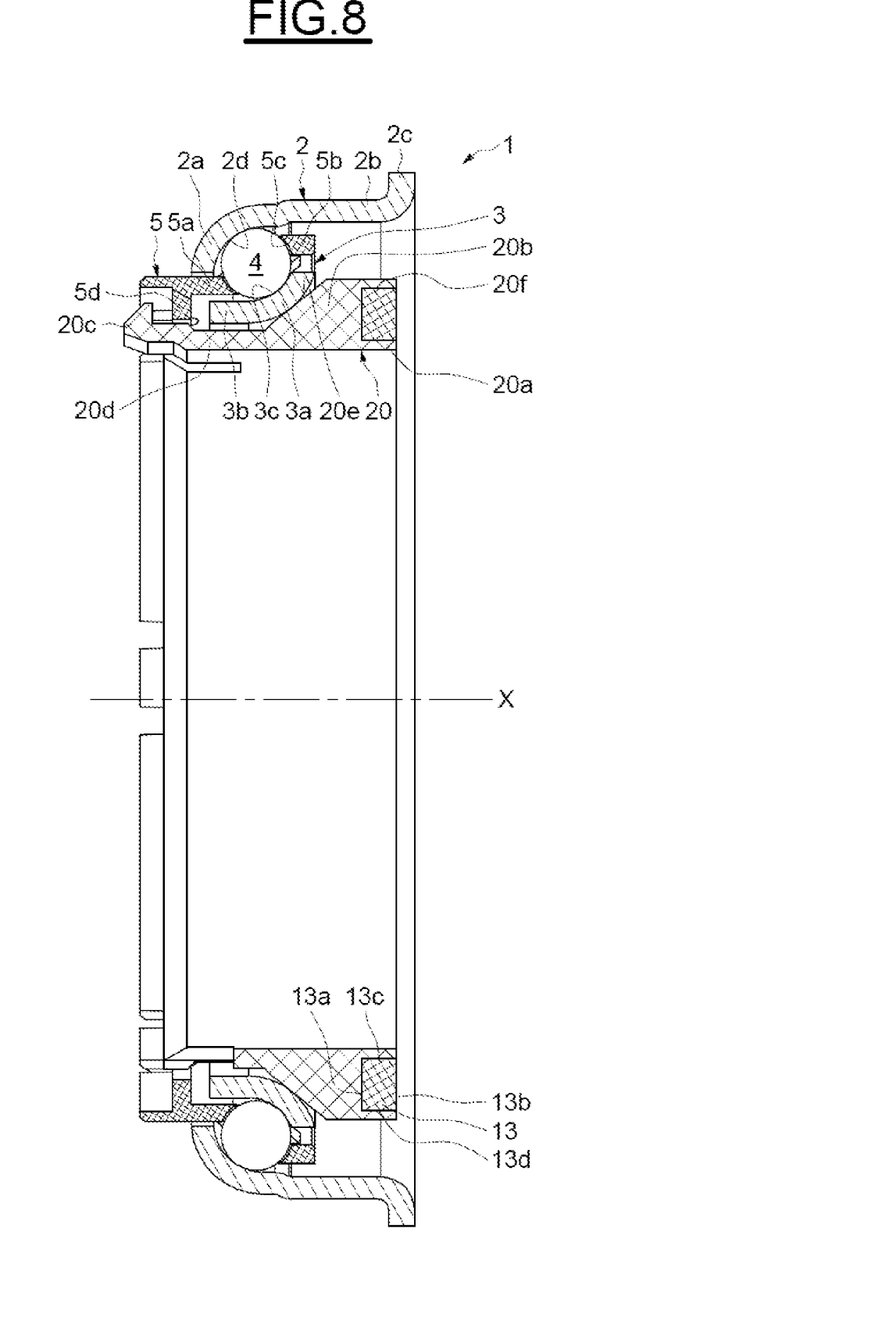
FIG. 8 is a view in axial section of a rolling bearing assembly device according to a fifth embodiment of the invention.

The embodiment illustrated in FIG. 8, in which the same elements have the same reference numerals, differs from the embodiment of FIGS. 4 to 6 only in terms of the shape of the sleeve.

As illustrated in FIG. 8, the rolling bearing assembly device 1 comprises a sleeve 20 comprising an annular axial centering portion 20a arranged in the bore of the inner race 3, a radial bearing flange 20b extending outwards from one end of the axial centering portion 20a on the same side as the large-diameter annular axial portion 5b of the cage 5, and a plurality of hooks 20c which are connected to the radial bearing flange 20b by a second axial portion 20d in contact with the bore of the inner race 3. The hooks 20c extend radially outwards from one end of the second axial portion 20d which is the opposite end to the radial bearing flange 20b. The hooks 20c, which are evenly circumferentially distributed over the periphery of the sleeve 20 in a discontinuous manner are designed to collaborate with the radial protrusion 5d of the cage 5. The radial bearing portion 20b has a substantially oblique surface 20e in direct contact with the exterior surface (unreferenced) of the torroidal portion 3a of the inner race 3 and extending outwards in the form of a third axial portion 20f. The sleeve 20 is produced as a single piece.

The rolling bearing assembly device 1 illustrated in FIG. 8 further comprises an elastic preload element 13, separate from the sleeve 20, of annular shape and having a right cross section of substantially rectangular shape, comprising a first radial surface 13a in direct axial contact with a radial surface (unreferenced) of the radial flange 20b which is the opposite surface to the oblique surface 20e, a second radial surface 13b, an inner cylindrical axial surface 13c in radial contact with the first axial portion 20a of the sleeve 20 and an exterior cylindrical axial surface 13d in radial contact with the third axial portion 20f of the sleeve 20. Thus, the elastic preload element 13 is arranged radially between the first and third axial portions 20a, 20f of the sleeve 20.

A variant option would be to provide a square shape or any other parallelepipedal shape. The elastic element 13 is mounted in direct contact with the exterior cylindrical surface (unreferenced) of the annular axial centering portion 20a of the sleeve 20 and bearing continuously axially in the circumferential direction against a radial surface of the radial bearing flange 20b, on the opposite side to the inner race 3, i.e. over the entire periphery of the radial bearing flange 20b. The inside diameter of the internal cylindrical axial surface 13c of the elastic element 13 is substantially equal to the diameter of the exterior cylindrical surface of the axial centering portion 20a of the sleeve 20.

The axial dimension of the elastic element 13 is substantially equal to the axial dimension of the centering portion 20a and of the third axial portion 20f, so as not to protrude beyond the sleeve 20.

The third axial portion 20f acts as a radial retention means making it possible to avoid radial deformation of the elastic preload element 13.

By virtue of the invention, the axial preload is uniformly distributed over the inner race.

In addition, such elastic preload elements are simple to manufacture and to fit to the sleeve.

The invention claimed is:

1. A rolling bearing assembly device comprising:
   an outer race;
   an inner race;
   a row of rolling elements arranged between the outer and inner races;
   a sleeve mounted in a bore of the inner race, the sleeve including an annual axial centering portion arranged in the bore and a radial bearing flange extending outwards from one end of the axial centering portion, the radial bearing flange providing a substantially oblique surface in direct contact with an exterior surface of the inner race; and
   an elastic preload element separate from the sleeve, the elastic preload element mounted in direct contact with the annual axial centering portion and capable of applying an axial preload transmitted to the inner race,
   wherein the elastic preload element provides a first radial surface which bears axially over its entire periphery against a radial surface of the radial bearing flange which is an opposite surface to the substantially oblique surface, and
   wherein the radial bearing flange is positioned between the elastic preload element and the exterior surface of the inner race.

2. The rolling bearing assembly device according to claim 1, further comprising an axial retention means including an axial part surrounding the elastic preload element and a plurality of radial tabs bearing axially against a second radial surface of the elastic preload element which is the opposite surface to the first radial surface.

3. The rolling bearing assembly device according to claim 2, wherein the sleeve provides an axial part forming a radial retention means in radial contact with an axial surface of the elastic preload element, the elastic preload element being arranged radially between the axial part and the annual axial centering portion.

4. The rolling bearing assembly device according to claim 1, wherein the sleeve is made as a single piece.

5. The rolling bearing assembly device according to claim 1, wherein the elastic preload element has an annular shape including an interior bore in direct contact with an exterior cylindrical surface of the annual axial centering portion.

6. The rolling bearing assembly device according to claim 5, wherein the elastic preload element has a right cross section of one of a circular and polygonal shape.

7. The rolling bearing assembly device according to claim 5, wherein the elastic preload element has a right cross section of one of a square and rectangular shape.

8. The rolling bearing assembly device according to claim 1, wherein the elastic preload element is made of a synthetic material.

9. A steering column comprising:
   a housing;
   a shaft; and
   at least one rolling bearing assembly device according to claim 1 mounted between the housing and the shaft.

10. The rolling bearing assembly device according to claim 1, wherein the elastic preload element is made of a polymer substance.

11. The rolling bearing assembly device according to claim 1, wherein the elastic preload element is made of rubber.

12. The rolling bearing assembly device according to claim 1, wherein the radial bearing flange includes an exterior cylindrical surface, and wherein the elastic preload element has an outside diameter substantially equal to a diameter of the exterior cylindrical surface of the radial bearing flange.

13. The rolling bearing assembly device according to claim 1, wherein the sleeve includes two axial portions which extend axially from the radial surface of the radial bearing flange, and wherein the elastic preload element is arranged radially between the two axial portions of the sleeve.

* * * * *